United States Patent [19]

Mori

[11] Patent Number: 4,785,941

[45] Date of Patent: Nov. 22, 1988

[54] APPARATUS FOR AUTOMATICALLY SELECTING ACCEPTABLE OR UNACCEPTABLE HOLLOW CYLINDRICAL PRODUCTS SUCH AS BUSHES

[75] Inventor: Sanae Mori, Nagoya, Japan

[73] Assignee: Daido Metal Company Ltd., Kita Ku Nagoya, Japan

[21] Appl. No.: 843,647

[22] Filed: Mar. 25, 1986

[30] Foreign Application Priority Data

Apr. 17, 1985 [JP] Japan .................................. 60-81584

[51] Int. Cl.⁴ ............................................... B07C 5/02
[52] U.S. Cl. ................................ 209/601; 33/178 B; 33/517; 33/523; 209/619; 209/688
[58] Field of Search ............... 209/599, 601, 619, 625, 209/657, 688, 699, 598; 33/517, 523, 178 B

[56] References Cited

FOREIGN PATENT DOCUMENTS

| 0193461 | 9/1986 | European Pat. Off. ............ 209/625 |
| 448899 | 4/1975 | U.S.S.R. ............................... 209/625 |
| 852115 | 10/1960 | United Kingdom . |
| 1084928 | 9/1967 | United Kingdom . |
| 1208500 | 10/1970 | United Kingdom . |
| 1281388 | 7/1972 | United Kingdom . |
| 1357716 | 6/1974 | United Kingdom . |
| 1416391 | 12/1975 | United Kingdom . |

*Primary Examiner*—Robert B. Reeves
*Assistant Examiner*—Donald T. Hajec
*Attorney, Agent, or Firm*—Browdy and Neimark

[57] ABSTRACT

An apparatus mechanically actuates GO ring gauges and NOGO ring gauges to check whether inner and outer diameters of hollow, cylindrical-shaped products such as bushes B/G are within fit tolerances, thus automatically distinguishing between acceptable and unacceptable products. The apparatus comprises a rotatable index plate, a plurality of guide bushes G/B provided circumferentially on the index plate for receiving cylindrical-shaped products such as bushes B/G, GO ring gauges and NOGO ring gauges, respectively engaged by the end surfaces of the guide bushes and provided circumferentially of the index plate in order and secured to a body, a mechanism for discharging hollow, cylindrical-shaped products such as bushes, a pusher mechanism for pushing one end surface of a hollow, cylindrical-shaped product through the guide bush into the inner bore of the GO ring gauges and NOGO ring gauges with a predetermined pressure to judge GO and NOGO of the product, a plug gauge mechanism for pushing a plug gauge into the inner bore of a hollow, cylindrical-shaped product with a predetermined pressure for the judgement of GO and NOGO of the product, and retractable knockout pusher mechanism for pushing the pusher mechanism into the other ends of the pusher plug gauge mechanisms for the GO ring gauges, and the plug gauge mechanism for the NOGO plug gauges and for pushing the other end surface of a hollow, cylindrical-shaped product in a direction opposite to the direction of advancement of the plug gauge mechanism with a fluctuating pressure to force the product back into the guide bush.

20 Claims, 10 Drawing Sheets

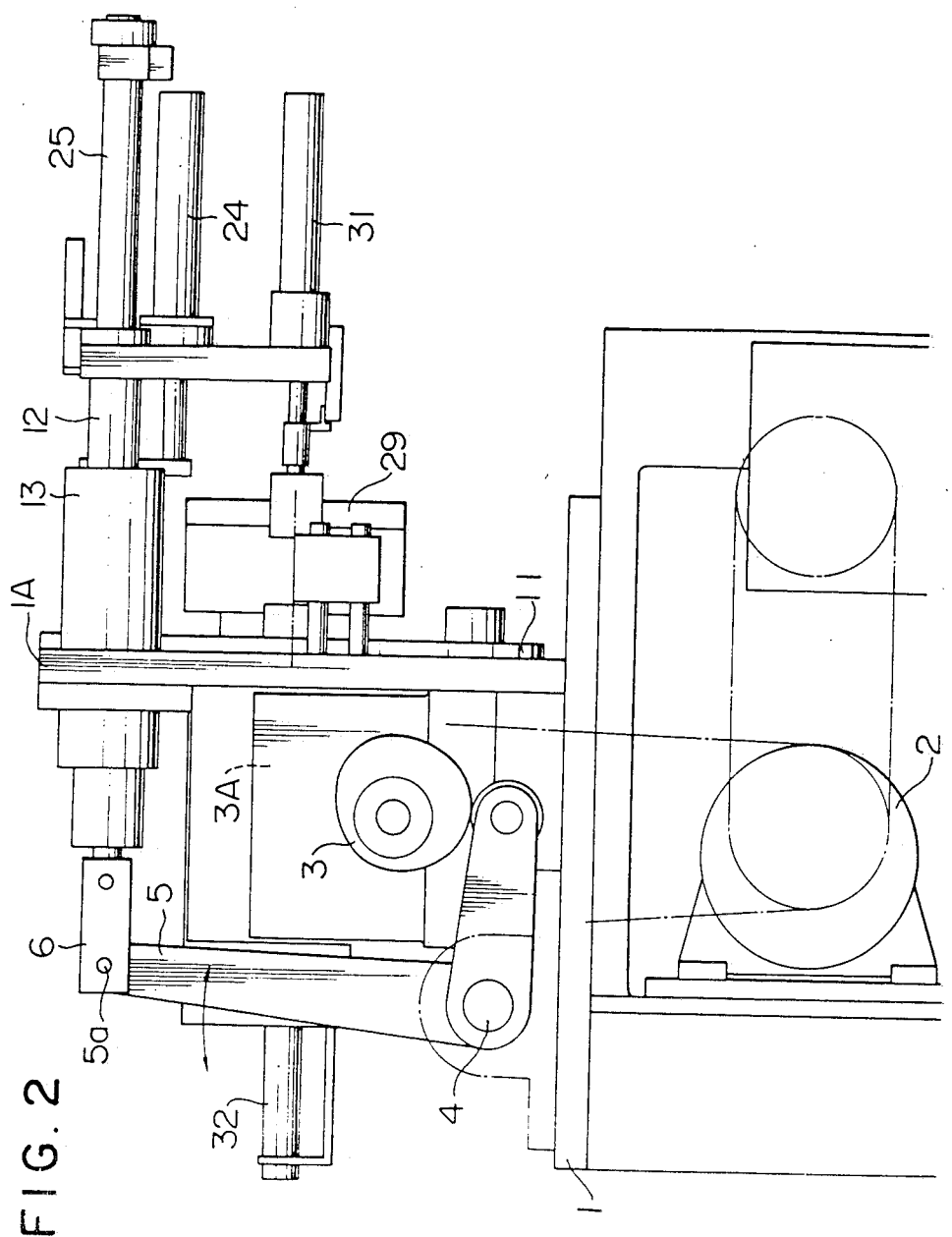

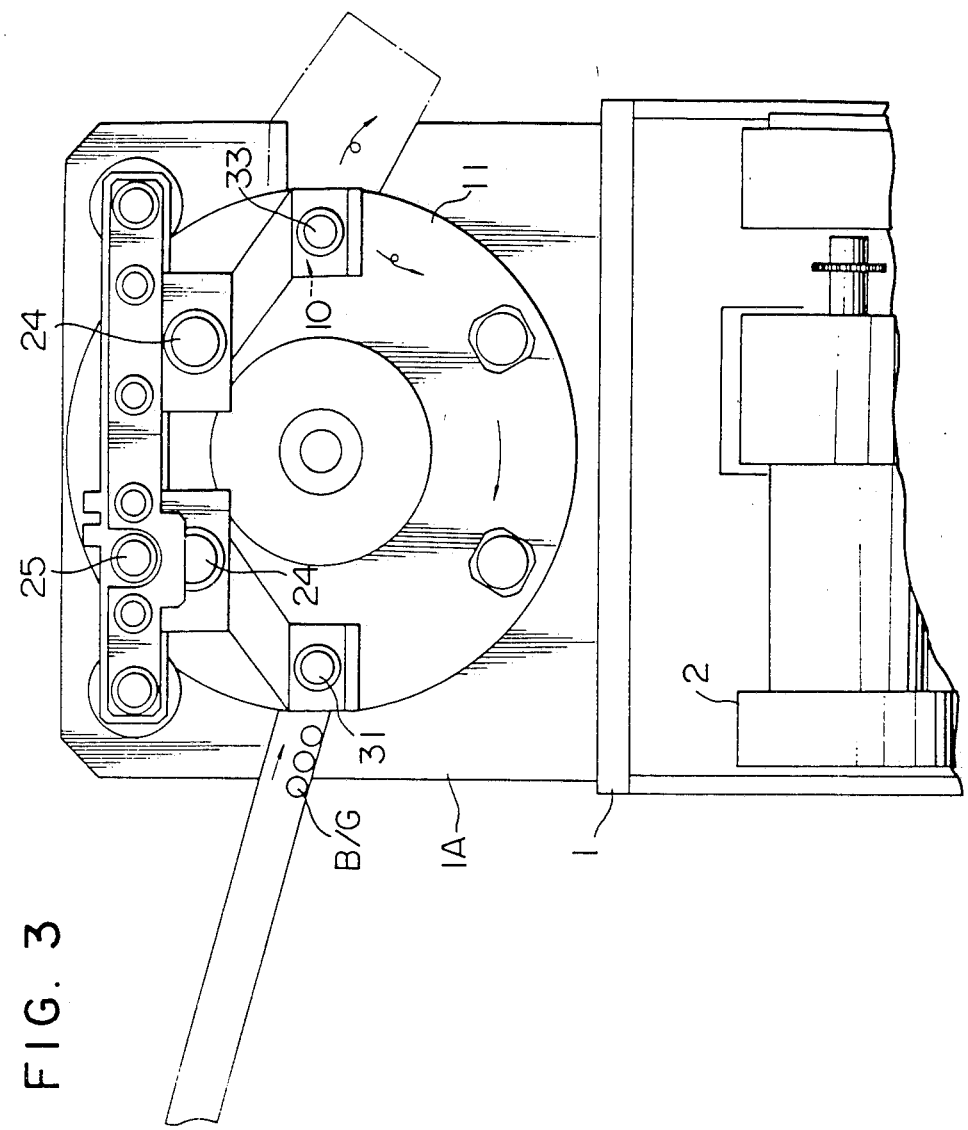

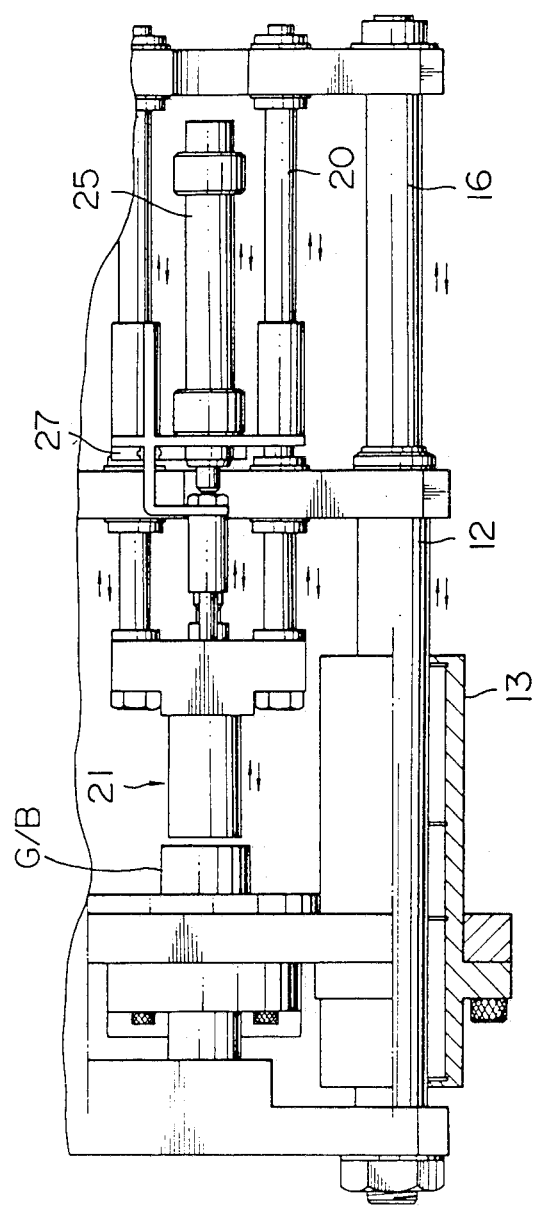

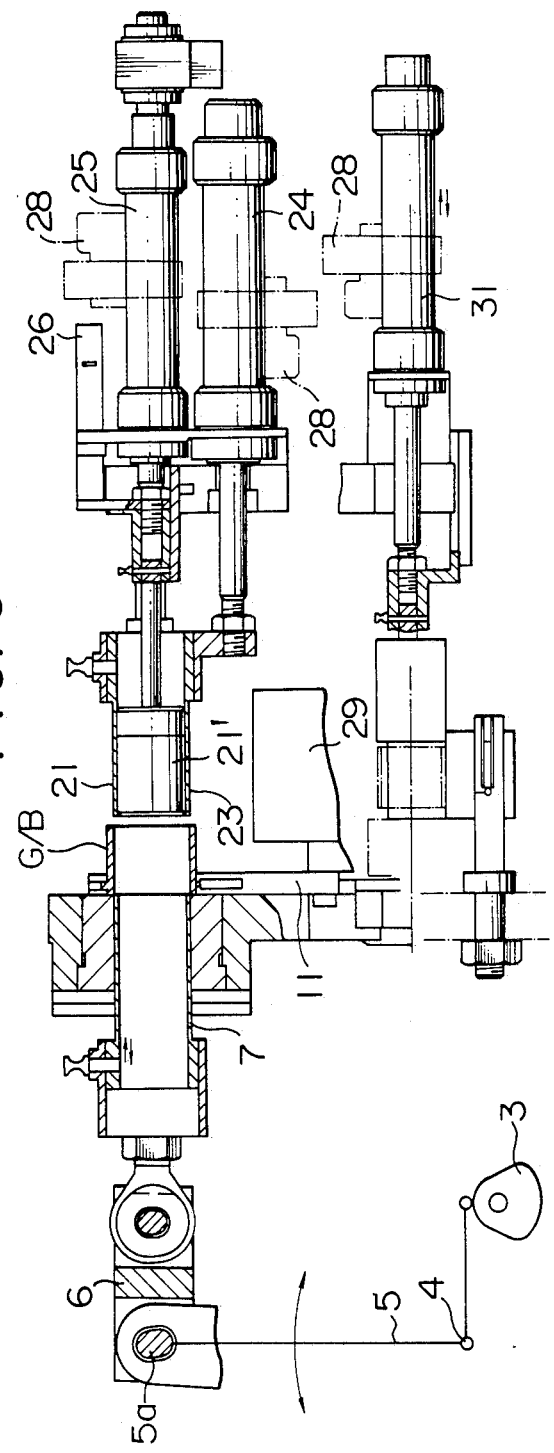
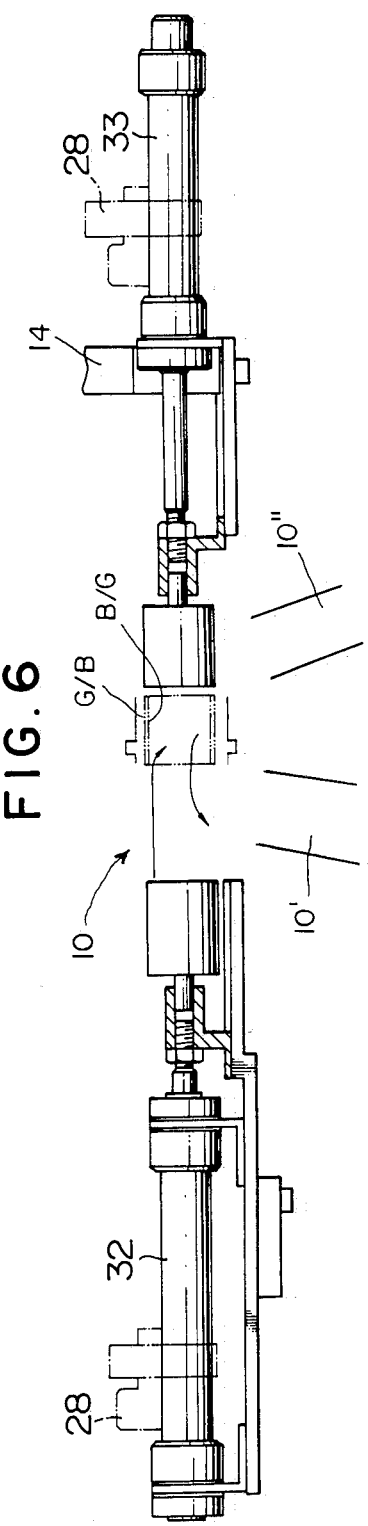

(STEPS IN MANUAL OPERATION)

4,785,941

APPARATUS FOR AUTOMATICALLY SELECTING ACCEPTABLE OR UNACCEPTABLE HOLLOW CYLINDRICAL PRODUCTS SUCH AS BUSHES

BACKGROUND OF THE INVENTION

The present invention relates to a mechanical inspection apparatus for mechanically actuating GO ring gauges and NOGO ring gauges to check whether inner and outer diameters of a hollow cylindrical product such as bushes for use with sliding parts of vehicles, ships, airplanes, industrial machinery, business machines, sound machines and the like are within an allowance or not and to automatically select acceptable and unacceptable products.

Heretofore, GO gauges and NOGO gauges are manually handled to judge whether inner and outer diameters of a hollow cylindrical product such as bushes are within an allowance or not. In this regard, there is an individual difference in the strength of hands and the sense of touch to cause scattering in inspection results and mixing of unacceptable products with acceptable products, thus making it impossible to definitely standardize a criterion for inspection. In particular, when inspection for shipment is performed such that inner and outer diameters of respective bushes are inspected piece by piece by manual operation, inspection of maximum and minimum outer diameters and maximum and minimum inner diameters of a bush is sequentially performed piece by piece by various GO and NOGO gauges, which is quite time-consuming and is disadvantageously low in efficiency of inspection and accuracy.

SUMMARY OF THE INVENTION

The object of the invention is to standardize judgment of acceptable and unacceptable products with respect to an allowance for inner and outer diameters through keeping constant the force required for inserting a hollow cylindrical product such as a bush into GO and NOGO gauges as well as the speed of insertion, thereby automatically performing selection of acceptable products and eliminating scattering of inspection as well as improving the efficiency of inspection.

According to the invention, there is provided an apparatus for automatically selecting hollow cylindrical products such as bushes which are acceptable and unacceptable with respect to inner and outer diameters thereof, said apparatus comprising a rotatable index plate; a plurality of guide bushes provided circumferentially of said index plate for receiving therein hollow cylindrical products such as bushes; a mechanism for discharging GO ring gauges, NOGO ring gauges and hollow cylindrical products such as bushes, said mechanism being adapted to engage the end surfaces of said guide bushes and provided in order circumferentially of said index plate and fixed to a body; a pusher mechanism for pushing one end of said hollow cylindrical product at a predetermined pressure into inner bores of said GO ring gauges and NOGO ring gauges through said guide bushes to judge GO and NOGO of said hollow cylindrical product; a plug gauge mechanism for pushing a plug gauge into an inner bore of said hollow cylindrical product for judgment of GO and NOGO; and a movable knockout pusher mechanism for pushing said pusher mechanism from the other end of said hollow cylindrical product in a direction opposite to the direction of movement of said GO ring gauge mechanism and for pushing the other end of said hollow cylindrical product at fluctuating pressures in a direction opposite to the direction of movement of said plug gauge mechanism to force said hollow cylindrical product back into said guide bush.

DESCRIPTION OF THE DRAWINGS

FIGS. 1 to 14 show an apparatus constructed in accordance with an embodiment of the invention, in which:

FIG. 1 is a plan view;

FIG. 2 is a front view;

FIG. 3 is a side elevational view;

FIG. 4 is an enlarged fragmentary view of the apparatus shown in FIG. 1;

FIG. 5 is an enlarged front view of a part of the apparatus shown in FIG. 2;

FIG. 6 is an enlarged front view of a pusher for discharging acceptable and unacceptable products;

FIGS. 7, 8, 9, 10, 11, 12 and 13 are longitudinal sectional views showing acceptable and unacceptable products determined by the positional relationship between bushes and gauges for inner and outer diameters;

FIG. 14 is a diagrammatic view of the apparatus according to the invention; and

DESCRIPTION OF THE PREFERRED EMBODIMENT

Figure 1:
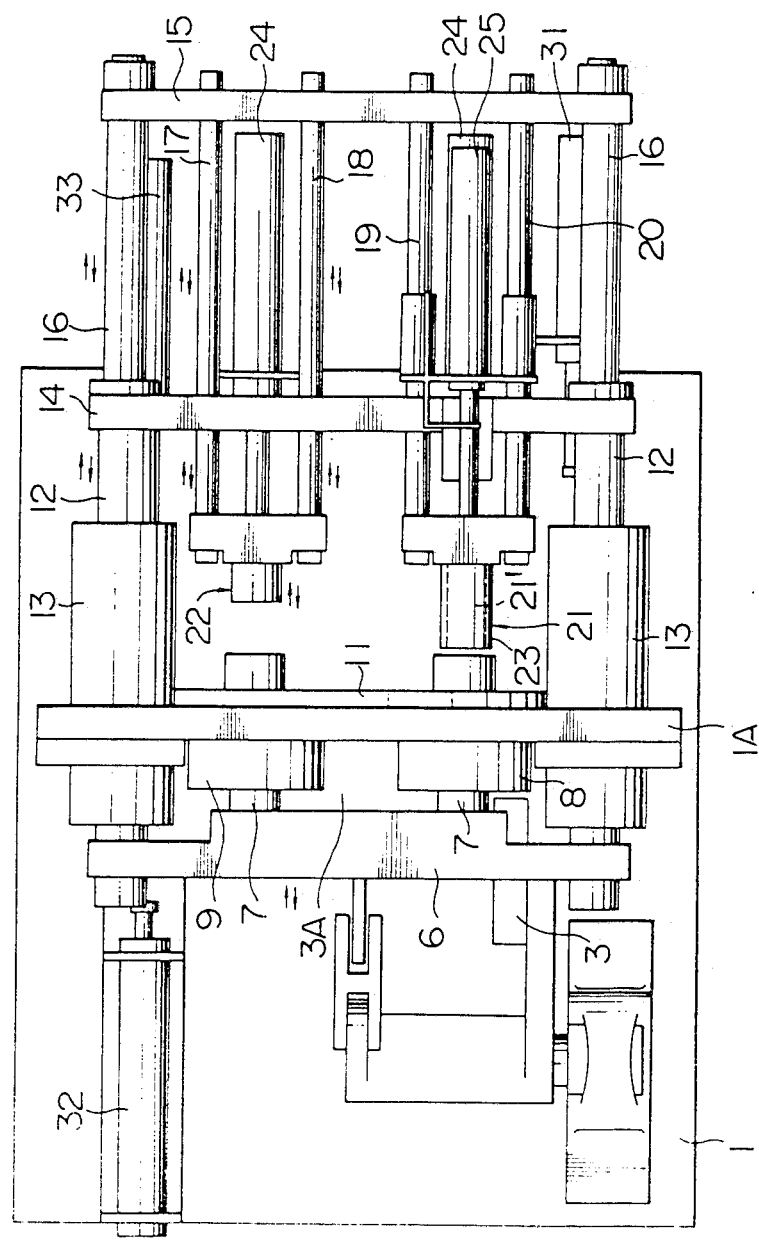
Figure 7:
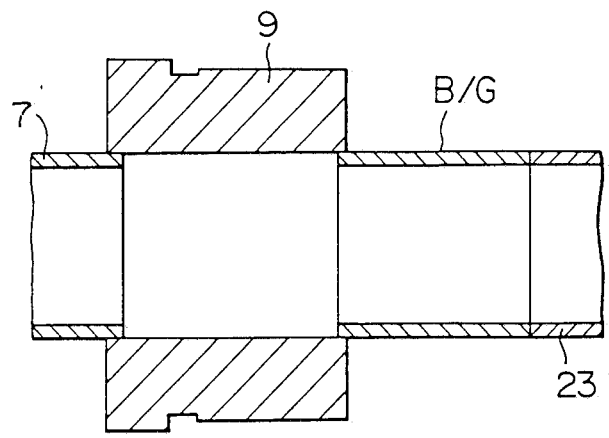
Figure 8:
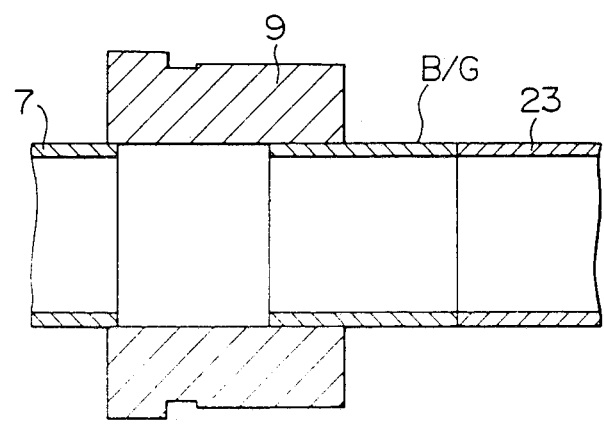
Figure 9:
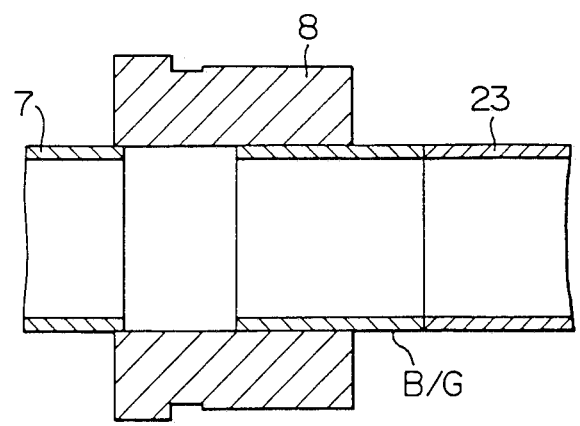
Figure 10:
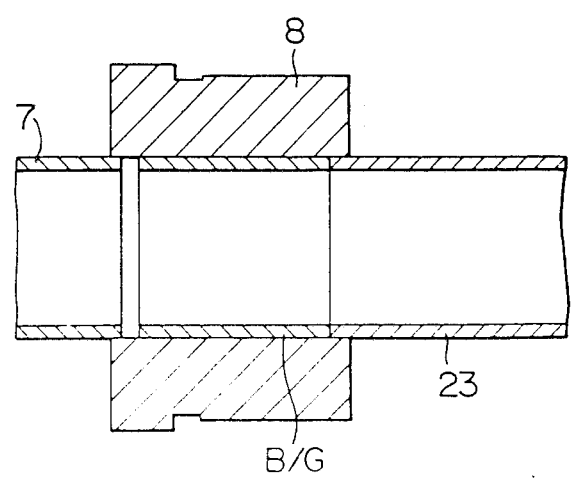
Figure 11:
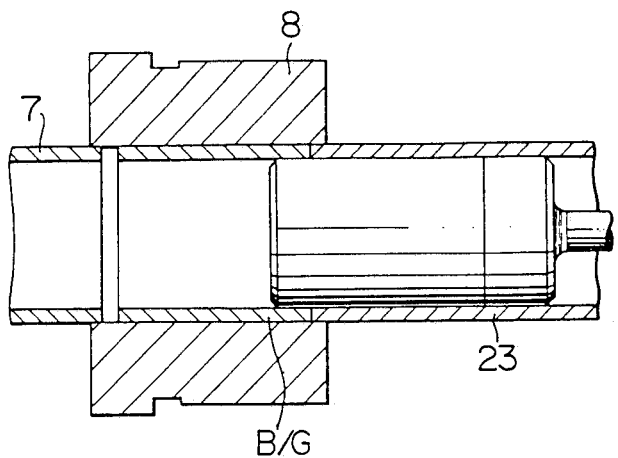
Figure 12:
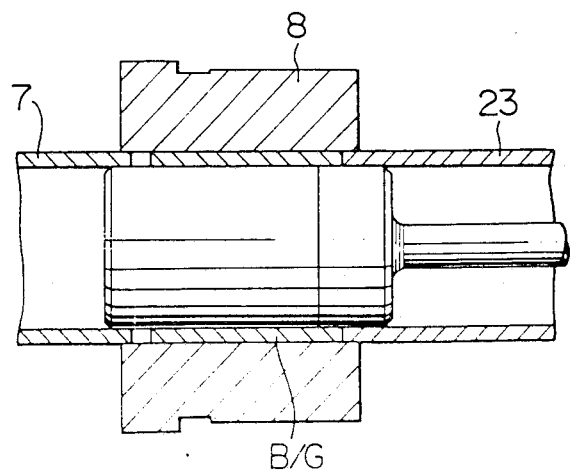
Figure 13:
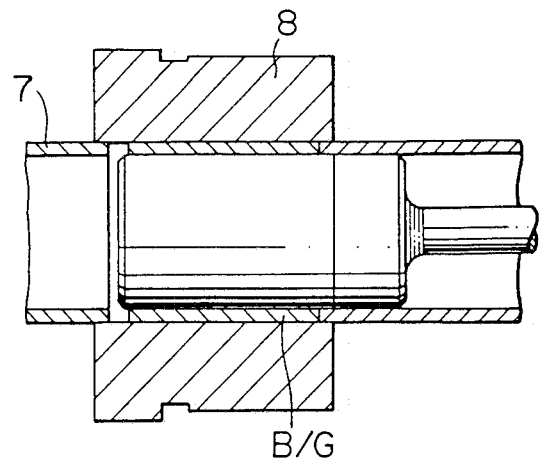
Figure 14:
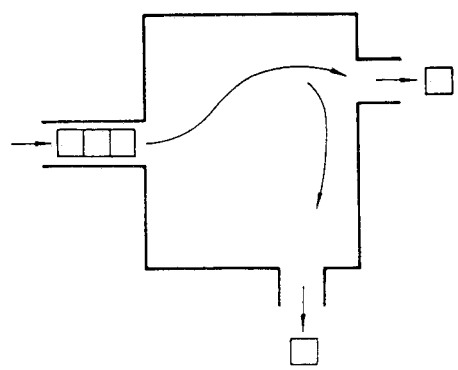
Figure 15:
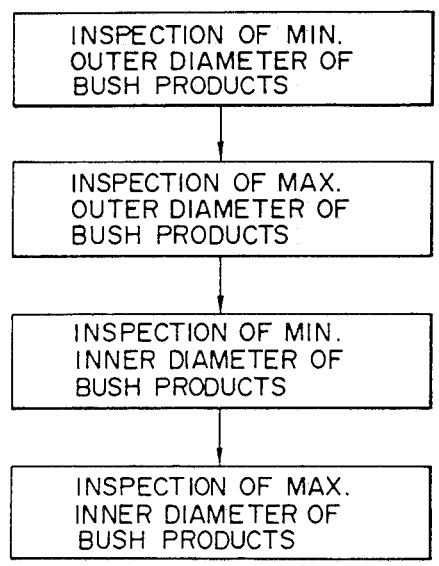
FIG. 15 is a view showing inspection steps in a prior manual operation for inner and outer diameters of bushes.

Referring now to FIGS. 1 and 2, an apparatus according to the invention comprises a rotating drive motor 2 mounted on a frame 1, a cam drive mechanism 3, a swing arm 5 driven through the cam mechanism 3 by the drive motor 2 to be rockable about a pivot 4, a joint member 6 pivotally mounted on a pin 5a disposed at the upper end of the swing arm, and a knockout pusher 7. The knockout pusher 7 serves to push an end surface of a bush product B/G back into a guide bush, which bush product is disposed in a GO ring gauge 8 secured to a vertical portion 1A of the frame 1 or in a NOGO ring gauge 9.

The respective end surfaces of the GO ring gauge 8 and the NOGO ring gauge 9 are disposed on an index plate 11 in a direction perpendicular to the direction of movement of the knockout pusher 7. The index plate 11 is circumferentially formed with a plurality of guide bushes G/B (six in number in the drawings), and is slidable and rotatable with the aid of an index gear 3A. As seen from FIGS. 1 and 2, a rod 12 is guided by a guide member 13 to be reciprocatory right and left in the same direction as the knockout pusher 7 moves, and is connected to the swing arm 5 to reciprocate in response to the swinging movement of the swing arm 5. The rod 12 performs the same movement, that is, leftward and rightward sliding movement as those of the members 14, 15 and 16 secured thereto, a pusher plug gauge mechanism 21 for the GO ring gauges and a pusher mechanism 22 for the NOGO ring gauges.

The pusher plug gauge mechanism 21 comprises a pusher 23, an air cylinder mechanism 24 and an air cylinder mechanism 25 for the plug gauges. Forces by which bush products B/G are pushed into the gauges are substantially varied in level. The pusher 23 is free to effect GO and NOGO movements in order that it can overcome such forces or be overcome thereby. As shown in FIGS. 1, 2 and 5, the air cylinder mechanism 24 acts at a predetermined pressure (normally, the force at the time of GO and NOGO actions is set at 5 to 30 kg on the basis of human strength). The air cylinder mechanism 25 for the plug gauges acts to advance and retreat a plug gauge 21' which is slidably movable in the inner bore of the pusher 23 and is free to go through the inner bore of the bush products B/G (see FIGS. 1, 2 and 5). The members 17, 18, 19 and 20 are free to act through the medium of the air cylinder mechanism 24. The air cylinder mechanism 24, 25 comprises a slit gauge 26 (see FIG. 5) for the inspection of the position of a rod for the cylinder, a photoelectric tube 27 (see FIG. 4), and a switch 28 (see FIGS. 5 and 6) for the detection of the position of said rod for the cylinder. Thus, in order to detect the position of the rod in the inner bore of the cylinder, the air cylinder mechanism 24 and 25 serve to detect how far a bush product enters into the GO or NOGO ring gauges and how far the plug gauge enters into the bush product so that acceptable and unacceptable bush products with respect to the inner and outer diameters thereof are automatically selected. It is preferable that forces required for the GO and NOGO actions of the pusher 23 and the plug gauge 21' are set in the range of 5 to 30 kg on the basis of human strength. Inlet and outlet ports of pressurized air to the air cylinder mechanism 24 and 25 are not shown for the sake of clarity.

The index plate 11 is rotated by the index gear 3A (see FIGS. 1 and 2), and is provided with a torque limiter 29, as shown in FIGS. 2 and 5, so that it can smoothly rotate at a predetermined speed and in the range of a predetermined torque. This torque limiter acts to provide a sliding state, that is, "an idling state" at the time of action of abnormal torque, thereby avoiding troubles.

As shown in FIG. 6, the air cylinder mechanism 32 is fixed to the frame 1, and the cylinder rod thereof is normally in its retracted position. On the other hand, the air cylinder mechanism 33 is fixed to the member 14 which is secured to the rod 12, and the cylinder rod thereof is normally in its extended position. It should be noted that, normally, most bush products B/G retained in the guide bushes G/B are GO products. Thus, normally, the cylinder mechanism 33 with its cylinder rod in the extended position reciprocates along with the member 14 in the axial direction. When one of the guide bushes G/B is brought into the discharge station 10 and a bush product B/G retained in the guide bush G/B is GO product as is the usual case, the air cylinder mechanism 33 with its cylinder rod in the extended position is shifted to the left (FIG. 6) along with the member 14, thereby pushing the GO product out of the bush guide B/G to the left to discharge the same to a GO product chute 10'.

On the other hand, if a bush product B/G retained in the guide bush G/B which has been brought into the discharge station 10 is a NOGO product, the whole apparatus is stopped. Thereafter, the cylinder rod of the air cylinder 33 is retracted, and at the same time the cylinder rod of the air cylinder 32 is extended, thereby pushing the NOGO product out of the guide bush G/B to the right to discharge the same to NOGO product chute 10''''. After the NOGO product is so discharged, the rod of the cylinder 32 is again retracted and the rod of the cylinder 33 is extended, and then the apparatus is again actuated to return to the initial or normal condition.

Referring now to FIGS. 7 to 13, there is shown a manner in which acceptable and unacceptable products, respectively, are selected on the basis of the positional relationship between bush products and various gauges for inner and outer diameters, such as NOGO ring gauges, GO ring gauges, NOGO plug gauges and GO ring gauges.

In the operation of the present apparatus, pressurized air is initially taken in so as to present gauge pressures compatible with bush products being inspected, and after a changeover switch (not shown) is changed over to a position of "manual operation", both push button switches (not shown) are pushed on to afford confirming the action of the respective cylinders.

Thereafter, the changeover switch is changed over to a position of "automatic operation" to afford feeding bush products from a charge chute to a charge section of the apparatus, as shown in FIG. 3. Then, the both push button switches are pushed down to allow an insertion air cylinder mechanism (31) (see FIG. 1) to insert bush products into the guide bushes G/B. Thereafter, the index plate 11 stops at a first position after completion of the rotation by 60 degrees in the clockwise direction, and the pusher plug gauge mechanism 21 is moved leftward for the inspection of the outer diameters of bush products B/G to force the bush products B/G into the GO ring gauges. In this manner, when a bush product is acceptable, the pusher 2 reaches the end of its stroke, and when a bush product is unacceptable, that is, the outer diameter thereof is excessively large, it can not enter into the GO ring gauge or stops on its way to the stroke end. Then, the plug gauge 21' disposed in the pusher 23 is moved leftward for the inspection of the inner diameters of bush products B/G, such that when the inner diameter of a bush product B/G being inspected is excessively small, the plug gauge 21' can not advance to the extent that the boundary between its forward, small diameter portion and its rearward, large diameter portion is positioned in the bush product, and when a bush product is acceptable, the plug gauge 21' stops at the position where such boundary reaches the bush product, and when the inner diameter of a bush product is excessively large, the plug gauge 21' passes through the bush product. After the inner diameter of a bush product is inspected, the plug gauge 21' returns rightward, and the pusher plug gauge mechanism 21 also returns rightward simultaneously. Thereafter, the knockout pusher 7 and the rod 12 move together to push back into the guide bush G/B a bush product B/G having been positioned in the GO ring gauge 8. On the other hand, in case a bush product B/G is excessively large in its outer diameter, it can not enter into the GO ring gauge 8, so that it remains in the guide bush G/B. When the knockout pusher 7 and the rod 12 return leftward and stop at their original positions after having reached the stroke end, the index plate 11 further rotates by 60 degrees to stop a bush product B/G at the second position corresponding to the position of the NOGO ring gauge 9. Then, the pusher mechanism 22 moves leftward to push into the NOGO ring gauge 9 a bush product B/G having been positioned in the guide bush G/B. Thus, when the bush product is acceptable, it does not enter into the NOGO ring gauge 9, and when a bush product is unacceptable, that is, its outer diameter is excessively small, it enters into the NOGO ring gauge 9, so that the pusher mechanism 22 advances leftward to provide a judgment to the effect that the bush product is unacceptable. Upon giving such judgment, the pusher mechanism 22 returns rightward. The pusher mechanisms 22 acts together with the pusher plug gauge mechanism 21, and rapidly completes its action without any action of the plug gauge 21′. The knockout pusher 7 and the rod 12 move rightward together to return back into the guide bush G/B a bush product B/G of an excessively small outer diameter having been positioned in the NOGO ring gauge 9. However, a bush product B/G, of which outer diameter is acceptable or excessively large, remains in the guide bushes G/B. When the knockout pusher 7 and the rod 12 return leftward and stop at their original positions after having reached the stroke end, the index plate 11 further rotates by 60 degrees to position the bush product B/G at a position corresponding to that of a discharge section 10.

When a bush product B/G having been positioned at the first position comes to the second position, a succeeding bush product B/G is fed to the first position for inspection. While the above operation is repeated, switches 28 (see FIG. 5) serving to check the inner and outer diameters of bush products on the basis of the positions of the GO ring gauges 8 and the NOGO ring gauges 9 shown in FIG. 1 give electric signals to actuate right and left air cylinder mechanisms 32, 33, such that when a bush product is acceptable, the right air cylinder mechanism 33 acts to discharge the bush product leftward from the associated guide bush, and when a bush product is unacceptable, the leftward air cylinder mechanism 32 acts to discharge the bush product rightward from the guide product.

In the apparatus according to the embodiment of the present invention, the index plate or index table 11 is used as a part of the constituent matter indispensable for the constitution of the invention, which index plate supports the plurality (six) of guide bushes G/B disposed at circumferentially equidistant intervals and for receiving known bush products of a single or multiple layers.

Such index plate 11 is used in order that the four steps, that is, (a) the charging of bush products B/G into the guide bushes G/B; (b) the GO and NOGO inspection of bush products passing from the guide bushes into the inner bores of the GO ring gauges and the GO and NOGO inspection of the inner diameters of bush products by the use of the plug gauges; (c) the GO and NOGO inspection of bush products passing from the guide bushes G/B into the inner bores of the NOGO ring gauges; and (d) the discharging of bush products outside from the guide bushes G/B are automatically and continuously performed by rotating a part, for example, an index gear of the index mechanism which acts to intermittently rotate the index plate 11 a constant angle by a constant angle, that is, index the index plate 11. Thus, the use of the index plate 11 affords automatically and continuously performing charging, inspection and discharging of bush products at a uniform speed and intermittently.

According to the invention, inner and outer diameters of hollow, cylindrical-shaped products such as bush products are checked to afford automatically and continuously selecting acceptable and unacceptable products from each other, and the result of inspection is uniform to standardize such selection, thereby eliminating the mixing of acceptable and unacceptable products with each other unlike the prior manual selection and providing automatic selection of acceptable and unacceptable products at high efficiency about five times as much as that of the manual operation. Accordingly, the apparatus constructed in accordance with the present invention is highly effective and efficient in inspecting inner and outer diameters of hollow cylindrical-shaped products for selection.

What is claimed is:

1. An apparatus for automatically selecting hollow, cylindrical-shaped products such as bushes on the basis of inner and outer diameters of the products, said products having end surfaces, said apparatus comprising;
   a rotatable index plate;
   a plurality of guide bushes provided circumferentially on said index plate for receiving hollow, cylindrical-shaped products such as bushes, said guide bushes having end surfaces;
   a GO ring gauge and a NOGO ring gauge secured to a frame of said apparatus and operable to engage with the end surfaces of said guide bushes, said GO ring gauge and said NOGO ring gauge having inner bores;
   a discharge mechanism for discharging said hollow, cylindrical-shaped products from the corresponding guide bushes, said GO ring gauge, said NOGO ring gauge and said discharge mechanism being arranged in order circumferentially of said index plate;
   a pusher mechanism for pushing one of the end surfaces of said hollow, cylindrical-shaped products through said guide bushes into the inner bores of said GO and NOGO ring gauges at a predetermined pressure for the judgment of GO and NOGO of said hollow, cylindrical-shaped products;
   a plug gauge mechanism for pushing plug gauges into the bores of said hollow, cylindrical-shaped products at a predetermined pressure for the judgment of GO and NOGO of said hollow, cylindrical-shaped products;
   a retractable knockout pusher mechanism for pushing a second of the end surfaces of said hollow, cylindrical-shaped products from the other ends of said GO and NOGO ring gauges to the outside in a direction opposite to the direction of advancement of said pusher mechanism and said plug gauge mechanism at a fluctuating pressure.

2. An apparatus as set forth in claim 1, wherein an end surface of said rotatable index plate is slidable relative to the end surfaces of said GO ring gauges and said NOGO ring gauges secured to said body.

3. An apparatus as set forth in claim 2, wherein said discharge mechanism includes a first chute for receiving acceptable products and a second chute for receiving unacceptable products.

4. An apparatus as set forth in claim 3, wherein said pusher mechanism includes reciprocating pistons and rods, and is connected to an air cylinder mechanism having a predetermined pressure.

5. An apparatus as set forth in claim 4, wherein said plug gauge mechanism is reciprocable in the inner bores of said pusher mechanism and includes a piston rod, and is connected to an air cylinder mechanism separate from said latter air cylinder mechanism.

6. An apparatus as set forth in claim 5, wherein said knockout pusher mechanism and said piston rod are operable to be reciprocatingly moved by a drive motor, cam mechanism, swing arm, joint and said guides in a direction parallel to the axial direction of said GO ring gauges and NOGO ring gauges.

7. An apparatus as set forth in claim 6, wherein said index plate is operable to be rotatingly moved by said cam mechanism and an index gear in a direction transverse to the direction of right and left sliding movements of said pusher mechanism and said plug mechanism.

8. An apparatus as set forth in claim 7, wherein said index plate is provided with a torque limiter.

9. An apparatus as set forth in claim 2, wherein said index plate is provided with a torque limiter.

10. An apparatus as set forth in claim 1, wherein said pusher mechanism includes reciprocating pistons and rods, and is connected to a first air cylinder mechanism having a predetermined pressure.

11. An apparatus as set forth in claim 10, wherein said plug gauge mechanism is reciprocable in the inner bores of said pusher mechanism and includes a piston rod, and is connected to an air cylinder mechanism separate from said latter air cylinder mechanism.

12. An apparatus as set forth in claim 10, wherein said plug gauge mechanism is reciprocable in the inner bores of said pusher mechanism and includes a piston rod, and is connected to a second air cylinder mechanism separate from said first air cylinder mechanism.

13. An apparatus as set forth in claim 12, wherein said knockout pusher mechanism and said piston rod are operable to be reciprocatingly moved by a drive motor, cam mechanism, swing arm, joint and said guides in a direction parallel to the axial direction of said GO ring gauges and NOGO ring gauges.

14. An apparatus as set forth in claim 12, wherein said knockout pusher mechanism and said piston rod are operable to be reciprocatingly moves by a drive motor, cam mechanism, swing arm, joint and said guides in a direction parallel to the axial direction of said GO ring gauges and NOGO ring gauges.

15. An apparatus as set forth in claim 1, wherein said index plate is provided with a torque limiter.

16. An apparatus as set forth in claim 14, wherein said index plate is operable to be rotatingly moved by said cam mechanism and index gear in a direction transverse to the direction of right and left sliding movements of said pusher mechanism and said plug mechanism.

17. An apparatus as set forth in claim 16, wherein said index plate is provided with a torque limiter.

18. An apparatus as set forth in claim 14, wherein said index plate is operable to be rotatingly moved by said cam mechanism and an index gear in a direction transverse to the direction of right and left sliding movements of said pusher mechanism and said plug mechanism.

19. An apparatus as set forth in claim 1, wherein said discharge mechanism includes a first chute for receiving acceptable products and a second chute for receiving unacceptable products.

20. An apparatus as set forth in claim 19, wherein said pusher mechanism includes reciprocating pistons and rods, and is connected to an air cylinder mechanism having a predetermined pressure.

* * * * *